April 17, 1962     C. L. SPORCK     3,029,667
METAL WORKING

Filed Aug. 31, 1955     4 Sheets-Sheet 1

INVENTOR
Claus Ludwig Sporck
BY
Synnestvedt & Lechner
ATTORNEYS

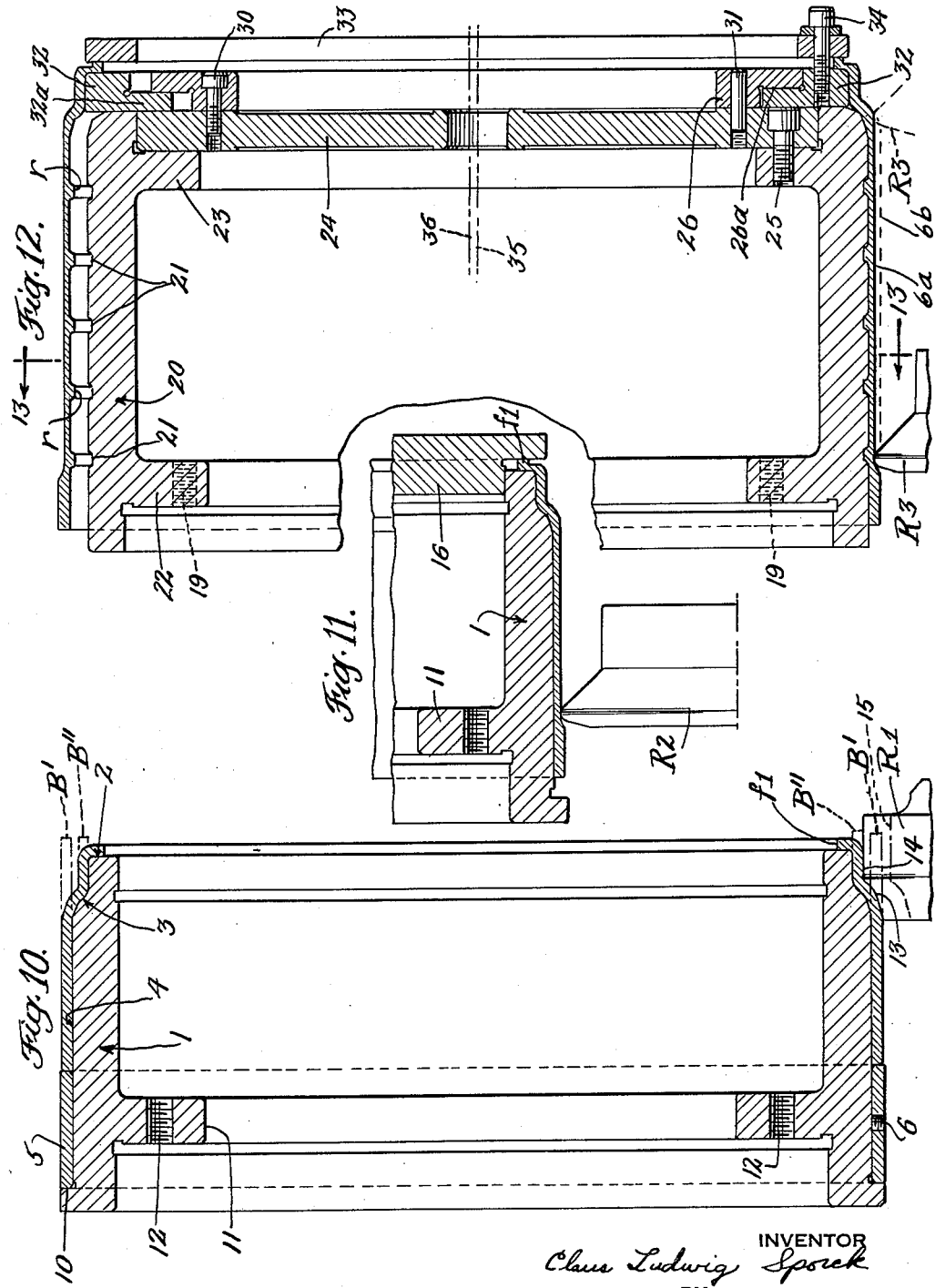

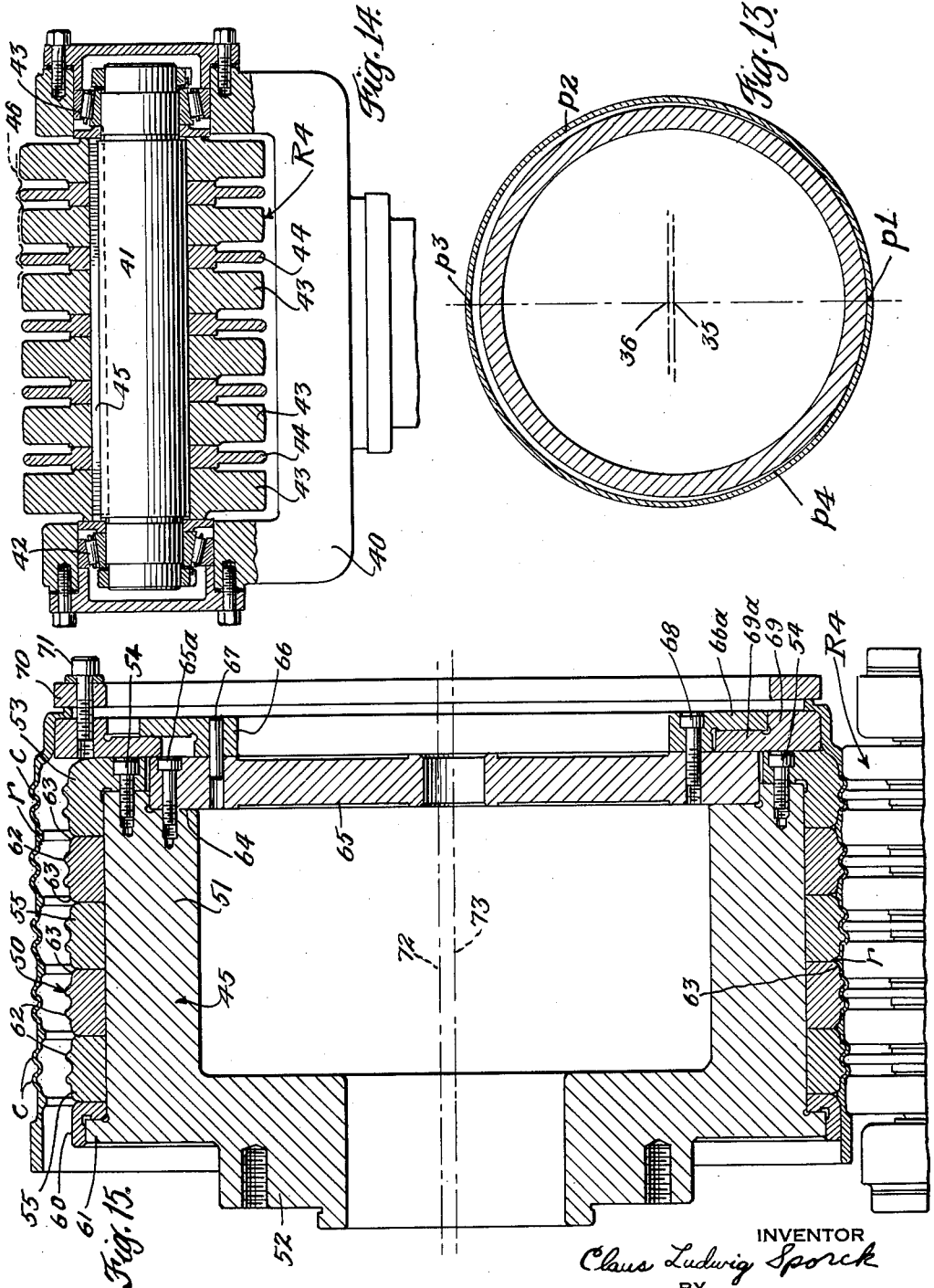

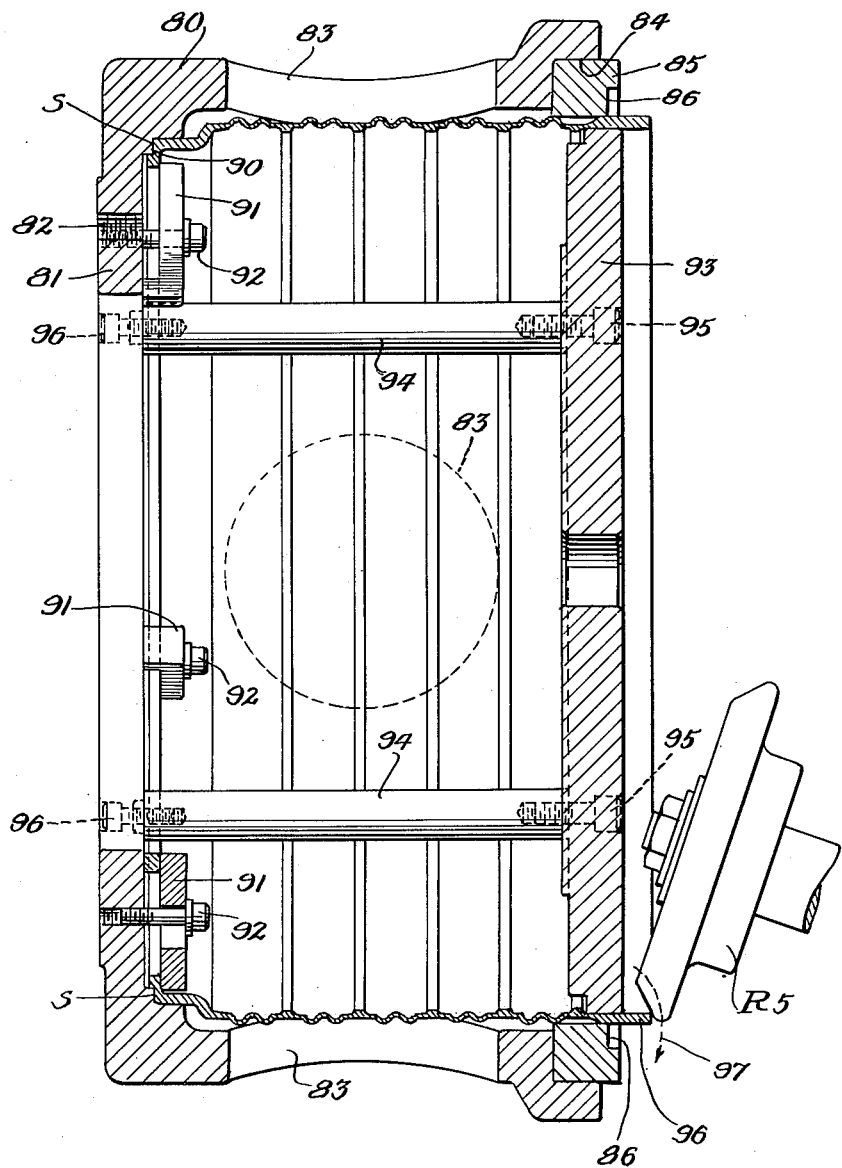

United States Patent Office 3,029,667
Patented Apr. 17, 1962

3,029,667
METAL WORKING
Claus Ludwig Sporck, Cincinnati, Ohio, assignor to The Lodge & Shipley Company, Cincinnati, Ohio, a corporation of Ohio
Filed Aug. 31, 1955, Ser. No. 531,684
2 Claims. (Cl. 80—5)

This invention relates to the art of metal working and, in particular, relates to the forming or shaping of articles from sheet metal stock. The apparatus disclosed herein may be used with machines such as shown in copending applications of Claus L. Sporck and Bernard Sassen, Serial Nos. 454,871 and 490,792, respectively filed September 9, 1954, and February 28, 1955.

One of the objects of the invention is to provide improved apparatus for the shaping or forming of a rib or ribs on the side of a hollow article by the displacing or the flowing of metal.

Another object of the invention is to provide improved apparatus for axially displacing the metal of the side of a hollow article whereby to form a rib or ribs integral therewith.

Another object of the invention is to provide improved apparatus for forming an article whose side has ribs integral therewith, the grain structure of the side including the rib or ribs being oriented generally in a helical manner.

Another object of the invention is to provide improved apparatus for the shaping or forming of an internal rib or ribs on the side of a hollow article by the displacing or flowing of metal.

Another object of the invention is to provide improved apparatus for the shaping or forming of a rib or ribs on the side of a hollow article without the use of a collapsible spindle or the like.

Another object of the invention is to provide a hollow article whose side has a rib or ribs integral therewith, the grain structure of the side including the rib or ribs being oriented generally in a helical manner.

Another object of the invention is to provide apparatus for the shaping or forming of a corrugation or corrugations on the side of a hollow article without the use of a collapsible spindle or the like.

The foregoing objects, together with other objects and features of the invention, will be readily understood from the following description and drawings wherein:

FIGURE 10 illustrates equipment used in the forming of the blanks of FIGURES 3 and 4;

FIGURE 11 is a fragmentary view of the equipment of FIGURE 10 with certain parts removed and illustrating the manufacture of the blank of FIGURE 6;

FIGURE 12 is a sectional view of the equipment used for forming ribs on the side of an article such as the ribs on the article of FIGURE 7;

FIGURE 13 is a view taken along the lines 13—13 in FIGURE 12 with certain parts removed and illustrating the manner in which the spindle and blank are rotated about spaced-apart axes;

FIGURE 14 is a view partially in section of a roller used to shape or form corrugations on the side of an article;

FIGURE 15 is a view partially in section of equipment used in the forming of corrugations on the side of an article, such as the corrugations on the article of FIGURE 8; and FIGURE 16 is a view partially in section of equipment for forming or shaping a flange on an article.

Unless otherwise required by the context, or limited by the prior art, the following terms will have the indicated meanings. The term "hollow" as used herein will be understood to apply generally to an article which is tubular or cylindrical in shape and may apply, in certain instances, to an article which is frusto-conical or hemispherical in shape. The term "sheet metal" is inclusive of plate and sheet or plate-like elements even when formed as castings, forgings, weldments or the like. The terms "shape" or "shaping" will be understood to mean the working of metal to form a rib or a corrugation or a plurality of the same and such structure or configuration analogous or equivalent thereto.

Before proceeding, it is pointed out that the equipment disclosed herein is adapted to be used with the machines of the above-mentioned copending applications. For example, the various spindles or tools herein described are adapted to be attached to the headstock of such machines so as to be rotatable. The various rollers herein described are adapted to be mounted on the roller rest or roller supports of the machines so as to be movable generally in a direction parallel to the rotational axis of the spindle and in a direction generally transverse the axis. The machines of the copending applications and like machines will be referred to hereinafter as "the operating machines."

In the description which follows, it will be apparent that in certain instances it is preferable to use only a single roller, while for certain other operations, two rollers may be used if this is desired. Thus, the operating machine may be equipped with a roller or rollers for use as desired under the circumstances.

Figure 1:
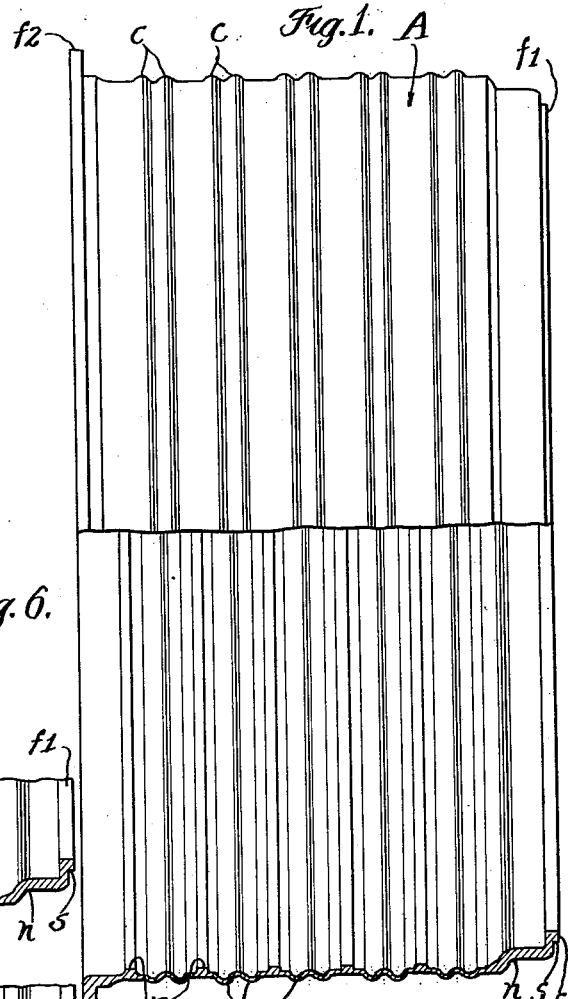
FIGURE 1 is a side elevational view partially in section of an article made in accordance with the equipment of the invention.

FIGURE 1 illustrates a generally cylindrically-shaped hollow article A made in accordance with the invention, the sides of the article having a plurality of corrugations c—c, internal ribs r—r, a neck portion n, and each end of the article has flanges f–1 and f–2. The particular article in question is a rear compressor case for a jet engine.

Figure 2:
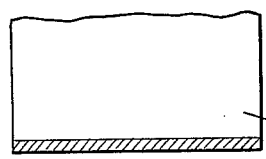
FIGURES 2 through 9 are fragmentary views illustrating the various stages of manufacture in the making of the article of FIGURE 1.
Figure 3:
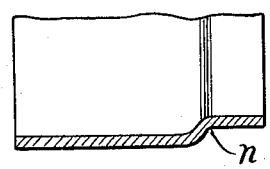
Figure 4:
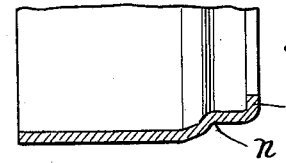

The FIGURES 2 to 9 constitute in effect a flow chart or the like showing the configuration and structure of blanks during the various stages of manufacture of the article of FIGURE 1. A brief description of these figures follows:

FIGURE 2 illustrates a generally cylindrically-shaped blank B which may be made in any suitable manner, for example, by cutting off a section of a tube or by wrapping up a flat sheet of metal and welding the abutting edges. In FIGURE 3 the blank B has been shaped so that the end has a neck portion n, and in FIGURE 4 the neck portion n has been shaped to have the flange f–1, while in FIGURE 5 the flange f–1 has a shoulder s machined therein.

Figure 6:
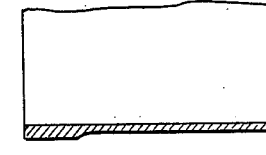
Figure 7:
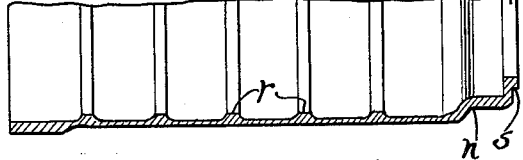
Figure 8:
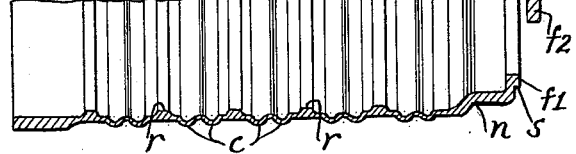
Figure 9:
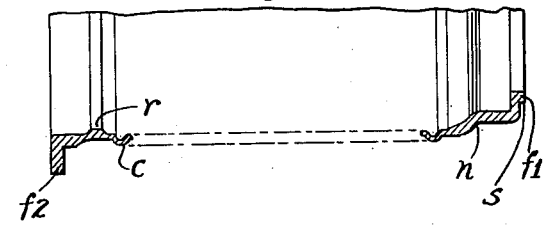

In FIGURE 6 the side of the blank has been thinned out and elongated. As seen in FIGURE 7, the blank of FIGURE 6 has been further shaped by being elongated and being provided with the ribs r—r internally thereof. In FIGURE 8 the side of the blank of FIGURE 7 has been shaped so as to have corrugations c—c formed interjacent the ribs. In FIGURE 9 the article of FIGURE 8 has been provided with a second flange f–2 to complete the steps in making up the article of FIGURE 1.

In the description of the invention which follows, a detailed explanation will be made as to the methods and apparatus used to shape the blanks of FIGURES 3 through 9.

The necking and flanging operation of the blank of

FIGURE 3 will be described in connection with FIGURE 10 wherein a generally cylindrically-shaped spindle or shaping tool 1 has an annular contoured flanging surface 2, a contoured necking surface 3 and a displacing surface 4. Arranged over the displacing surface 4 is a spacer or abutment 5 held in place by a plurality of set screws, one of which is indicated at 6. The spacer 5 engages an annular shoulder 10 on the tool. On the inside of the tool is an annular shoulder 11 which provides a means for mounting the tool to a headstock of an operating machine. Attachment may be made by means of bolts (not shown) cooperating with the threaded holes 12—12.

The necking and flanging roller R-1 has a contoured necking surface 13 corresponding to the necking surface of the tool and a flanging surface 14. The roller R is adapted to be mounted on a support or roller rest of the operating machine. The blank B of FIGURE 2 is placed on the tool as indicated by B' in FIGURE 10 and while the spindle and blank are rotating, the roller R is made to move, say, from a point indicated by the dotted line 15 radially inwardly so that the blank is necked as indicated at B". The roller R is then moved axially so that the flanging surface 14 is positioned away from the surface 2 an axial distance about equal to the thickness of the blank. Then the roller is moved radially inwardly and the blank shaped so that the flange f-1 is formed.

Figure 5:
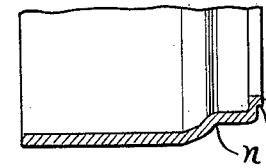

The blank is then removed from the tool and the flange f-1 machined to form the shoulder s of FIGURE 5.

The elongation of the article or blank of FIGURE 6 is completed on the tool 1 except that the abutment 5 is removed (see FIGURE 11) and a clamp plate 16 is fixed against the flange f-1. The clamp plate may be fixed in position by providing a plurality of screws threaded into the shoulder 11 but preferably the tailstock of the operating machine is made to abut up against the clamp. The blank of FIGURE 5 is disposed on the tool, and while the blank and tool are rotating, a roller R-2 is moved parallel to the displacing surface 4 in engagement with the blank to axially displace the metal and thin out and elongate the side.

The cooperative action between the spindle and the tool causes the grain structure of the metal of the elongated side to be arranged generally in a helical manner and is of important advantage in that the tensile strength of the article is greatly increased.

The next operation involves the shaping of the article to form the ribs on the side. In the shaping or the forming of ribs integral with the side of the article, it is important that the spindle and the article be operatively conditioned to be in contact with one another but rotate about spaced-apart axes. In the preferred embodiment of the invention, the spindle and article are arranged so that the article surrounds the spindle, and the form of the apparatus which permits the operative condition mentioned above will be explained in connection with FIGURES 12 and 13.

In FIGURE 12 a generally cylindrically-shaped spindle or shaping tool 20 has a plurality of peripheral grooves or shaping surfaces 21—21, and on the inside of the spindle are annular shoulders 22 and 23. The shoulder 22 may be used to mount the spindle on the headstock of the operating machine as by bolts (not shown) mating with the threaded holes 19—19. The shoulder 23 supports a center plate 24, which may be secured thereto by a plurality of screws 25—25. A locating ring 26 is mounted on the center plate by means of the screws 30—30 and is adapted to be accurately positioned on the plate by the dowel pins 31—31. The locating ring has an annular shoulder 26a which holds a guide ring 32, the annular shoulder 32a of the guide ring engaging the shoulder 26a of the locating ring. The guide ring abuts the end of the spindle 20 and the center plate 24, and the fit between these parts is such that the ring has freedom for sliding motion. A blank or article such as that shown in FIGURE 6 having an inside diameter greater than the outside diameter of the spindle is mounted on the guide ring and held in place by the clamp 33 secured to the guide ring by the screws and washers 34, so that the article has no independent axial movement.

From the foregoing, it will be apparent that the guide ring, the article and the clamp ring have freedom for limited universal movement in a plane radial or transverse spindle axis. If the article and rings are moved all the way over to the left, the inside surface of the article will engage in substantially line-to-line contact with the surface of the spindle. In this position it will be seen that if the spindle and blank are rotated, the spindle will rotate about its own axis 35 while the blank will rotate about its axis 36, which is spaced from the spindle axis. This motion is accommodated by the sliding action of the guide ring with respect to the spindle in providing that any point on the blank (or guide ring) may move toward and away from the spindle axis during rotation. This will be understood from an inspection of FIGURE 13 wherein the designation p-1 represents a point on the blank adjacent the line-to-line contact with the spindle, and as this point rotates (say, counter-clockwise) to a position indicated by p-2, the radial distance between the point and the spindle axis has increased over that when the point was at p-1. At the position indicated by p-3 (diametrically opposite to p-1) the point is at its greatest distance from the spindle axis. As the point moves to the position indicated by p-4, the radial distance from the spindle axis is less than that of p-3 and further decreases until it reaches the position p-1.

With the blank mounted as above mentioned, the roller R-3 is brought up to engage the article and push the same against the spindle so as to make line-to-line contact. A position of the roller to accomplish the foregoing is indicated by the dotted lines in FIGURE 12. With the spindle and the article rotating, the roller is caused to move axially generally parallel to the surface of the spindle and along the line of contact so as to displace the metal of the article. As the roller moves along, the surface 6a of the blank of FIGURE 6 is brought down to the level 6b (FIGURE 12), part of the displaced metal flowing into the grooves 21 (to form the ribs r—r) and the remainder flowing lengthwise to elongate the article. The final outside surface 6b is substantially smooth and cylindrical.

It will be apparent that one of the decided advantages of the operation just described is that the ribs are formed integrally with the sides and so adding strength to the article. Furthermore, the cooperative action between the roller and the spindle causes the grain structure of the sides of the article to be arranged in a helical manner and this helical formation is present in the ribs. Another advantage is that the rib-forming operation takes only a matter of minutes and consequently there is a great saving in time and labor over the ordinary manner of providing ribs, i.e., by welding individual ribs to the sides.

After the ribs have been formed, the blank is removed from the spindle for the corrugating operation explained following in connection with FIGURES 14 and 15.

In FIGURE 14 a corrugating roller R-4 has a generally yoke-shaped frame 40 rotatably supporting a shaft 41 by the bearings 42 and 43. The shaft 41 carries a plurality of disk-like members 43—43 together with a plurality of smaller disk-like members 44—44 interposed between the disks 43. All of the disks are adapted to be keyed to the shaft by key 45. The arrangement of the outer surfaces of the disks 43 and 44 forms shaping or corrugating surfaces as indicated by the dotted lines 46—46. The roller R-4 is adapted to be used with a corrugating spindle 47 (FIGURE 15) which has corresponding shaping or corrugating surfaces generally designated by the numeral 50.

The spindle 47 has a main body 51, the end 52 of which is adapted to be secured to the headstock of the operating machine. The corrugating surface 50 is made up as explained following. On the end of the spindle is a ring 53 secured to the body as by screws 54—54. A plurality of other rings 55—55 is disposed on the body in abutting relationship with one another and with a ring 60 on the shoulder 61. When the screws 54 are drawn up tight, the rings are locked in place on the body. The ring 53 and the rings 55 have shaping or corrugating surfaces 62—62 which are adapted to cooperate with the surfaces 46 of the roller R-4. The rings are further contoured as indicated at 63—63 to provide an open space to accommodate the ribs r—r during the corrugating operation.

On the end of the body 51 is a shoulder 64 on which is secured a center plate 65 by a plurality of screws, one of which is indicated by 65a. On the center plate 65 is a locating ring 66 which is accurately positioned with respect to the plate by the dowels 67 and secured in place by the screws 68. The locating ring 66 has an annular shoulder 66a which holds a guide ring 69, the annular shoulder 69a of the guide ring engaging the shoulder 66a of the locating ring. The guide ring abuts the center plate 65 and the ring 53. The fit between the parts is such that the guide ring has freedom for sliding motion. An article or blank such as shown in FIGURE 7 is mounted on the guide ring and held in place by the clamp ring 70 secured to the guide ring by screws 71.

It will be apparent that the above-described manner of mounting the article is similar to that described in connection with FIGURE 12. Thus, the article can contact the spindle yet rotate about its axis 72 which is spaced from the spindle rotational axis 73.

With the article mounted on the spindle and with the article and spindle rotating, the roller R-4 is positioned so that the corresponding corrugating surfaces are in the same radial planes, and then the roller is moved in radially to contact the article so that the article and spindle are in generally a line-to-line contact relationship. Then the roller R-4 is further moved radially so that the article is shaped with the corrugations c—c as indicated in FIGURES 1, 8 and 15.

After the corrugations have been formed, the article is removed from the spindle and then set up for the second flanging operation, which will be explained in connection with FIGURE 16.

In FIGURE 16 a generally cup-shaped spindle 80 is arranged at its end 81 to be connected to the headstock of the operating machine, for example, by screws (not shown) disposed in a plurality of threaded holes, one of which is indicated by 82. The spindle is provided with a plurality of lightening apertures 83—83, together with an annular shoulder 84 carrying a nose ring 85. The ring 85 has an annular shoulder 86, which is adapted to be used in the forming of the second flange. The blank is disposed within the spindle with the machine surface s cooperating with the annular shoulder 90. The blank is adapted to be held in position by a plurality of clamps 91—91 secured to the spindle by screws 92—92. At the mouth of the blank is a support plate 93 mounted on a plurality of posts 94—94 and fixed thereto by screws 95—95. The posts are secured to the spindle by the screws 96—96.

With a blank mounted on the spindle as above described and with the spindle rotating, a roller R-5 is made to engage the tip 96 of the blank and move in an arcuate path such as generally indicated by the dotted line 97 to cause the tip to move into the space provided by the annular shoulder 86 and form the flange f-2.

I claim:
1. Metal-working equipment for shaping the side of a hollow article comprising: a spindle having an annular flat slider surface on one end thereof and a plurality of peripherally-arranged shaping surfaces spaced one from another along the axis of the spindle; a locating ring fixed to said one end of the spindle and having an annular shoulder extending over a portion of said slider surface; a guide ring mounted on said surface having an annular shoulder cooperating with first said shoulder whereby the slider is movable toward and away from the rotational axis of the spindle, the guide ring being adapted to mount a hollow article; and clamp means on said guide ring adapted to hold an article mounted thereon.

2. Metal working equipment for shaping the side of a hollow article comprising: a spindle adapted to be rotated and having a peripheral surface including a shaping groove; a support; means for clamping a hollow article the side of which is to be shaped to said support; mounting means on the spindle; mounting means on the support and a sliding connection between said mounting means providing for limited movement of the support relative to the spindle toward and away from the rotational axis of the spindle.

References Cited in the file of this patent

UNITED STATES PATENTS

| | | |
|---|---|---|
| 286,115 | Chaumont | Oct. 2, 1883 |
| 414,767 | Fox | Nov. 12, 1889 |
| 602,926 | Zuhlke | Apr. 26, 1898 |
| 843,518 | Clark | Feb. 5, 1907 |
| 899,762 | Richards | Sept. 29, 1908 |
| 1,223,219 | Tichborne | Apr. 17, 1917 |
| 1,396,179 | Foley | Nov. 8, 1921 |
| 1,463,073 | Felten | July 24, 1923 |
| 1,614,563 | Leach | Jan. 18, 1927 |
| 2,005,215 | Batie | June 18, 1935 |
| 2,039,646 | Hoisington | May 5, 1936 |
| 2,086,488 | Batie | July 6, 1937 |
| 2,095,310 | Brandt | Oct. 12, 1937 |
| 2,131,027 | French | Sept. 27, 1938 |
| 2,170,946 | Grief | Aug. 29, 1939 |
| 2,206,296 | Clarke | July 2, 1940 |
| 2,581,876 | Parker | Jan. 8, 1952 |
| 2,636,406 | Salter | Apr. 28, 1953 |
| 2,754,706 | Larsen | July 17, 1956 |

FOREIGN PATENTS

| | | |
|---|---|---|
| 368,522 | Great Britain | Mar. 10, 1932 |
| 515,445 | Germany | Jan. 3, 1931 |
| 1,054,291 | France | Feb. 9, 1954 |